June 12, 1951 — R. S. FOX ET AL — 2,556,580
SCREW THREAD GAUGE
Filed June 19, 1946
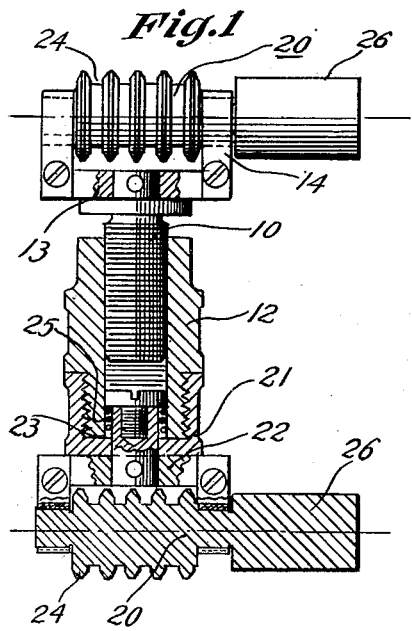
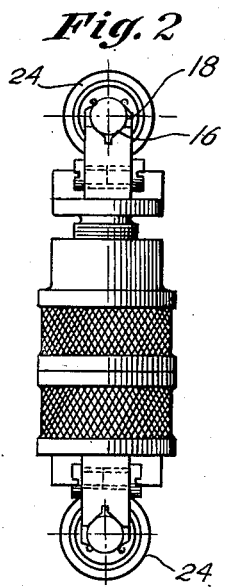
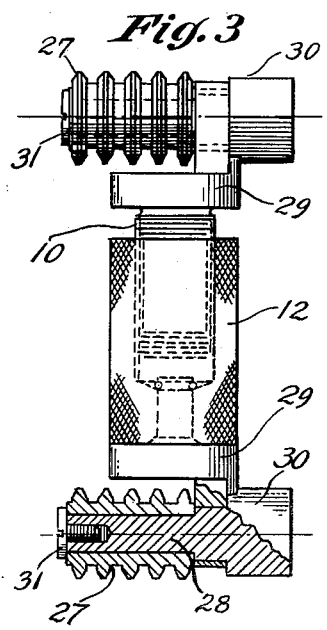
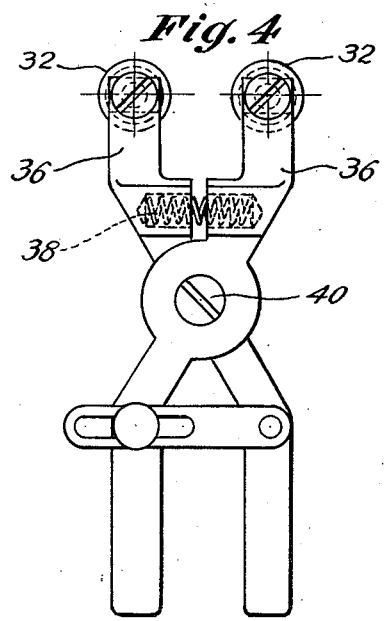
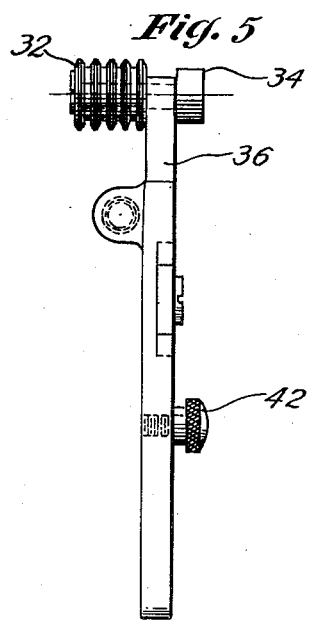
INVENTORS
R. S. Fox
F. J. Larson
BY Joseph N. Schofield
ATTORNEY Patented June 12, 1951

2,556,580

UNITED STATES PATENT OFFICE 2,556,580

SCREW THREAD GAUGE

Raymond S. Fox, West Hartford, and Frederick J. Larson, East Hartford, Conn., assignors to Niles-Bement-Pond Company, West Hartford, Conn., a corporation of New Jersey Application June 19, 1946, Serial No. 677,805

3 Claims. (Cl. 33—199)

1

This invention relates to gages and particularly to adjustable screw thread gages adapted to determine the accuracy of the pitch diameter and other characteristics of internal screw threads.

A primary object of the present invention is to measure the pitch diameter of internal screw threads quickly and accurately by the application of a standard outside micrometer to extensions formed on screw thread engaging members while in their gaging or measuring position.

A feature that enables the above object to be accomplished is that the screw thread engaging members have annular ribs adapted to engage the screw threads being gaged and also have extending coaxially therefrom cylindrical surfaces of such diameter that by calipering the distance between the outside portions of these opposed cylindrical surfaces the pitch diameter of the screw threads being gaged may be obtained.

Another object of the invention is to provide adjustable supporting means for the screw thread engaging members enabling these members to be quickly positioned within the member being gaged to properly engage the screw threads.

And finally it is an object of the invention to provide means to removably mount these screw thread engaging members on the opposite ends of their adjustable support so that members adapted for different types of screw threads, sizes, or pitches may be conveniently substituted.

Other objects and advantages will be apparent from the specification and claims and from the drawing, which illustrates what are now considered to be preferred embodiments of the invention.

In the drawing:

Figure 1 is an elevation, partly in section, of a complete gage made according to the present invention.

Fig. 2 is a side view of the gage, the view being taken from the left-hand side of the gage as shown in Fig. 1.

Fig. 3 is a view of a form of the invention showing a different support and mounting for the screw thread engaging members.

Fig. 4 is a modified form of the invention adapted primarily for relatively small screw threads and adapted for quick adjustment of the thread engaging members to a position in which the grooved members will engage the member being gaged, and Fig. 5 is a side view of the gage shown in Fig. 4.

In its preferred form the invention may include the following principal parts: First, an adjustable support in the form of a telescoping or extensible member adapted for adjustment to different lengths to accommodate various diameters of threads being gaged; second, screw thread engaging members mounted on the opposite ends of said support; third, an annularly grooved portion on these members, the spacing of the grooves providing annular ribs corresponding to a multiple of the pitch of the screw threads being gaged; fourth, cylindrical portions on these members coaxial with the annular grooved portion, the diameter of which cylindrical portions being accurately machined to a predetermined dimension relative to the diameter of the grooved portion; fifth, means to mount these grooved members on their support in parallel relation to each other for quick and convenient attachment or detachment therefrom.

Referring more in detail to the figures of the drawing, there is shown in Figs. 1 and 2 a preferred form of the invention in which a supporting member is made up of an externally screw threaded member 10 threaded into an intermediate member 12. The member 10 has a yoke portion 14 provided with spaced parallel bearings in the form of V-shaped recesses 16. Within these bearings 16 and retained therein by opposed spring clips 18 is a thread engaging member 20 presently to be more fully described. The intermediate member 12 at its opposite end has an end member 22 rotatably mounted thereon. The end member 22 has spaced parallel bearings similar to bearings 16 in the member 10 and support a thread engaging member identical to member 20 referred to above. By adjustment of the intermediate member 12 relative to the member 10 the distance between the end members 14 and 22 and their thread engaging members 20 may be adjusted for various diameters of screw threads. To facilitate this adjustment into thread engaging contact, one of the end members shown at 22 and 29 is attached to the intermediate member 12 so that it may swivel as shown. This end member 22 has a central projection or extension 23 fitting within the intermediate member 12. A spring 25 surrounding this extension 23 bears at one end against a threaded cap member 21 and at its opposite end against a headed screw threaded into the extension 23.

The thread engaging members 20 as shown in Figs. 1 and 2 have spaced journal portions fitting the bearings 16. Between these journal portions is a grooved section 24, the grooves being annular and providing annular ribs conforming in spacing and proportions to the threads being gaged. On one end of the members 20 are cylindrical portions 26, the diameter of which is equal to the pitch diameter of the threads engaged by the grooved portion of the members 20. By this disposition of the diameter of the cylindrical portion of the thread engaging members relative to the grooved portion, the distance between the outer portions of opposed rolls, as measured by an outside micrometer when the rolls are in gaging position, will equal the pitch diameter of the threads being gaged.

By means of the spring clips 18 which are attached to the end members 14 and 22 and resiliently engage the thread engaging members, substitutions of different members for gaging threads of various types and pitches can be readily made.

In Fig. 3 a modified form of the invention is shown in which thread engaging members 27 are in the form of grooved sleeves or rolls rotatable on a stud 28. The stud 28 is pressed into an end member 29 similar generally to those shown in Figs. 1 and 2 and has a head 30 thereon of cylindrical form. This head 30 is machined to a diameter corresponding to the pitch diameter of the grooved roll 27. A headed screw 31 retains the members 27 on their studs 28.

In Figs. 4 and 5 another modified form of the invention is shown in which the grooved rolls 32 having cylindrical surfaces 34 thereon are mounted parallelly to each other on pivotally mounted arms 36, there being a spring 38 between the pivot 40 and the grooved work engaging members 32 so that there is normally a resilient pressure exerted upon these members to move them outwardly into their gaging position. Also in this form of gage there may be provided a locking or clamping means 42 to lock the gage in operative or thread engaging position when the micrometer is applied to the cylindrical surfaces 34.

In the use of these gages the supporting member is chosen so that the grooved rollers 20, 27 or 32 can fit within and be adjustable into engagement with screw threads being gaged. The support may then be locked in position and by means of a standard outside micrometer the distance between the outside portions or the two cylindrical portions of the work engaging members is determined. Variations of this dimension from a corresponding dimension obtained by gaging a master gage indicates errors in the threads being gaged either in their pitch diameter or lead or both. By the provision of the end members the thread engaging members are maintained on parallel axes and may adjust themselves to fit closely in intermeshing relation with the threads being gaged.

We claim:

1. An internal screw thread gage, comprising a lengthwise adjustable member, bearing surfaces at the opposite ends thereof for supporting gaging members on axes parallel to each other and normal to said lengthwise adjustable member, said gaging members having a ribbed portion and a plain cylindrical portion, an intermediate portion of said gaging members resting on said bearing surfaces, and spring retaining members on said adjustable member for said gaging members.

2. An internal screw thread gage, comprising a two-part screw threaded adjustable member, bearing surfaces at the opposite ends thereof for supporting gaging members on axes parallel to each other and normal to the axis of said adjustable member, said gaging members having a ribbed portion and a plain cylindrical portion at opposite ends thereof, said gaging members resting on said bearing surfaces, and spring members on the ends of said adjustable member for retaining said gaging members in operative position.

3. An internal screw thread gage comprising a lengthwise adjustable member, V-shaped bearing surfaces at the opposite ends thereof for supporting gaging members on axes parallel to each other and normal to said lengthwise adjustable member, said gaging members having a ribbed portion and a plain cylindrical portion, a cylindrical portion of said gaging members resting on said bearing surfaces, and retaining means on said adjustable member for supporting said gaging members in operative position.

RAYMOND S. FOX.
FREDERICK J. LARSON.

REFERENCES CITED

The following references are of record in the file of this patent:

UNITED STATES PATENTS

| Number | Name | Date |
|---|---|---|
| 1,871,178 | Hudson | Aug. 9, 1932 |
| 2,214,633 | Dillon | Sept. 10, 1940 |
| 2,249,611 | Johnson | July 15, 1941 |
| 2,250,076 | Harley | July 22, 1941 |
| 2,314,199 | Dillon | Mar. 16, 1943 |
| 2,358,264 | Taylor | Sept. 12, 1944 |